(12) United States Patent
Young et al.

(10) Patent No.: US 11,700,839 B2
(45) Date of Patent: Jul. 18, 2023

(54) CALIBRATION TARGET FOR ULTRASONIC REMOVAL OF ECTOPARASITES FROM FISH

(71) Applicant: X Development LLC, Mountain View, CA (US)

(72) Inventors: Grace Calvert Young, Mountain View, CA (US); Bryce Jason Remesch, San Jose, CA (US); Matthew Aaron Knoll, Mountain View, CA (US)

(73) Assignee: X. Development, Mountain View, CA (US)

( * ) Notice: Subject to any disclaimer, the term of this patent is extended or adjusted under 35 U.S.C. 154(b) by 143 days.

(21) Appl. No.: 17/464,276

(22) Filed: Sep. 1, 2021

(65) Prior Publication Data

US 2023/0067723 A1    Mar. 2, 2023

(51) Int. Cl.
| | | |
|---|---|---|
| *A01K 61/13* | (2017.01) | |
| *A01M 1/22* | (2006.01) | |
| *G05B 19/042* | (2006.01) | |

(52) U.S. Cl.
CPC .............. *A01K 61/13* (2017.01); *A01M 1/226* (2013.01); *G05B 19/042* (2013.01); *G05B 2219/25257* (2013.01)

(58) Field of Classification Search
CPC ........ A01K 85/16; A01K 85/00; A01K 85/02; A01K 85/01; A01K 91/065; A01K 83/06; A01K 97/04; A01K 97/02; A01K 63/006; A01K 69/06; A01K 69/10; A01K 91/08; A01K 97/00; A01K 97/01; A01K 97/05; A01K 97/06; A01K 2217/05; A01K 61/95; A01K 69/00; A01K 74/00; A01K 85/10; A01K 85/14; A01K 85/18; A01K 89/017; A01K 75/02; A01K 79/02; A01K 83/02; A01K 85/12; A01K 91/00; A01K 91/04; A01K 91/06; A01K 97/045; A01K 97/11;

(Continued)

(56) References Cited

U.S. PATENT DOCUMENTS

| | | |
|---|---|---|
| 7,996,057 B2 | 8/2011 | Govari et al. |
| 10,856,520 B1 | 12/2020 | Kozachenok et al. |

(Continued)

FOREIGN PATENT DOCUMENTS

| | | |
|---|---|---|
| CL | 2019000039 A1 | 3/2019 |
| CL | 2020002834 A1 | 2/2021 |

(Continued)

OTHER PUBLICATIONS

International Search Report and Written Opinion in International Appln. No. PCT/US2022/033053, dated Sep. 9, 2022, 14 pages.

(Continued)

*Primary Examiner* — Michael P Stafira
(74) *Attorney, Agent, or Firm* — Fish & Richardson P.C.

(57) ABSTRACT

Methods, systems, and apparatus, including computer programs encoded on computer-storage media, for a calibration target for ultrasonic removal of ectoparasites from fish. In some implementations, the calibration target includes a fish-shaped structure, sensors positioned at different locations of the fish-shaped structure, a processor that receives sensor values from the sensors, and a transmitter that outputs sensor data from the calibration target based on the sensor values.

17 Claims, 10 Drawing Sheets

(58) Field of Classification Search
CPC ........ A01K 97/22; A01K 99/00; A01K 61/10; A01K 61/00; A01K 61/90; A01K 2227/40; A01K 61/60; A01K 79/00; A01K 61/13; A01K 75/00; A01K 63/003; A01K 73/00; A01K 73/02; A01K 73/10; A01K 61/80; A01K 61/65; A01K 61/85; A01K 63/042; A01K 63/065; A01K 2217/075; A01K 63/04; A01K 29/00; A01K 63/045; A01K 63/047; A01K 63/06; A01K 67/0275; A01K 67/0278; A01K 73/04; A01K 75/06; A01K 2207/15; A01K 2217/052; A01K 2217/072; A01K 2217/15; A01K 2217/203; A01K 2227/101; A01K 2227/105; A01K 2267/01; A01K 2267/03; A01K 2267/0356; A01K 2267/0393; A01K 5/0114; A01K 61/54; A01K 63/10; A01K 67/0273; A01K 80/00; A01K 91/20; A01K 93/02; A01K 97/125; A01M 31/06; A63B 35/06; G01N 2500/00; G01N 33/5005; G01N 33/5008; G01N 33/5011; G01N 33/502; G01N 33/5091; G01N 33/68; G01N 33/6845; G01N 33/9493; G05B 19/04; G05B 19/048; G05B 19/4183; G05B 19/41855; G05B 2219/21103; G05B 2219/24065; G05B 23/0213

See application file for complete search history.

(56) References Cited

U.S. PATENT DOCUMENTS

| | | | |
|---|---|---|---|
| 11,051,791 | B2 | 7/2021 | Smith et al. |
| 2007/0220798 | A1* | 9/2007 | Davidson ............... A01K 91/20 43/43.12 |
| 2009/0000177 | A1* | 1/2009 | Johnson ................ A01M 31/06 43/42.32 |
| 2015/0128474 | A1* | 5/2015 | James ..................... A01K 85/01 43/42.31 |
| 2015/0342169 | A1 | 12/2015 | Zeevi |
| 2016/0007581 | A1* | 1/2016 | Davidson ............... A01K 85/01 359/809 |
| 2017/0150701 | A1 | 6/2017 | Gilmore et al. |
| 2019/0228218 | A1 | 7/2019 | Barnaby et al. |
| 2019/0340440 | A1 | 11/2019 | Atwater et al. |
| 2020/0107524 | A1 | 4/2020 | Messana et al. |
| 2020/0155882 | A1 | 5/2020 | Tohidi et al. |
| 2020/0288678 | A1 | 9/2020 | Howe et al. |
| 2020/0297322 | A1 | 9/2020 | Labyed |
| 2021/0212298 | A1* | 7/2021 | Messana ................ H04N 23/56 |
| 2021/0289758 | A1* | 9/2021 | Li .......................... A01K 61/95 |
| 2021/0329891 | A1* | 10/2021 | Kozachenok .......... A01K 61/80 |
| 2022/0192160 | A1* | 6/2022 | Young .................... G06V 40/10 |

FOREIGN PATENT DOCUMENTS

| | | | | |
|---|---|---|---|---|
| CN | 2628239 | Y | * | 7/2004 |
| CN | 101916071 | A | * | 12/2010 |
| CN | 108040948 | | | 5/2018 |
| CN | 110248542 | A | * | 9/2019 ............ A01K 13/00 |
| CN | 210634736 | U | * | 5/2020 |
| CN | 210954766 | U | * | 7/2020 |
| DK | 201400427 | A1 | * | 2/2016 |
| EP | 2244934 | | | 11/2010 |
| EP | 2837284 | A1 | * | 2/2015 ............ A01K 61/00 |
| EP | 2793566 | B1 | * | 4/2017 ............ A01K 61/13 |
| EP | 3484283 | | | 5/2019 |
| JP | 2002171853 | | | 6/2002 |
| NO | 300401 | | | 5/1997 |
| NO | 20160199 | | | 8/2017 |
| WO | WO 1990/007874 | | | 7/1990 |
| WO | WO 1997/019587 | | | 6/1997 |
| WO | WO 2009/008733 | | | 1/2009 |
| WO | WO 2009/097057 | | | 8/2009 |
| WO | WO2012081990 | | | 6/2012 |
| WO | WO-2013051725 | A1 | * | 4/2013 ............ A01K 61/60 |
| WO | WO 2014/179482 | | | 11/2014 |
| WO | WO 2017/044985 | | | 3/2017 |
| WO | WO-2017044985 | A2 | * | 3/2017 ........... A01K 13/003 |
| WO | WO2017137896 | | | 8/2017 |
| WO | WO-2017199019 | A1 | * | 11/2017 ............ A01K 61/13 |
| WO | WO 2018/011744 | | | 1/2018 |
| WO | WO2018011745 | | | 1/2018 |
| WO | WO-2018167003 | A1 | * | 9/2018 ............ A01K 61/13 |
| WO | WO 2018/212665 | | | 11/2018 |
| WO | WO 2019/002881 | | | 1/2019 |
| WO | WO 2019/121851 | | | 6/2019 |
| WO | WO-2019107963 | A1 | * | 6/2019 ............ A01K 61/13 |
| WO | WO-2019121854 | A1 | * | 6/2019 ............ A01K 61/13 |
| WO | WO-2019121887 | A1 | * | 6/2019 ............ A01K 61/13 |
| WO | WO-2019121900 | A1 | * | 6/2019 ............ A01K 61/13 |
| WO | WO-2019146827 | A1 | * | 8/2019 |
| WO | WO 2019/188506 | | | 10/2019 |
| WO | WO 2019/232247 | | | 12/2019 |
| WO | WO-2019245722 | A1 | * | 12/2019 |
| WO | WO 2020/046524 | | | 3/2020 |
| WO | WO 2020/132031 | | | 6/2020 |
| WO | WO 2021/006744 | | | 1/2021 |
| WO | WO 2021/030237 | | | 2/2021 |
| WO | WO 2022/010815 | | | 1/2022 |
| WO | WO 2020/072438 | | | 4/2022 |
| WO | WO 2022/087757 | | | 5/2022 |

OTHER PUBLICATIONS

Notification of the International Application No. and of the International Filing Date in International Appln. PCT/US2022/033053, Jun. 27, 2022, 1 pages.

PCT Appln. No. PCT/US2022/033053, Young et al., Calibration Target for Ultrasonic Removal of Ecoparasites from Fish, filed Jun. 10 4, 2022, 44 pages.

Extended Search Report in European Appln. No. 22151132.2, dated May 2, 2022, 10 pages.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

International Search Report and Written Opinion in International Appln. No. PCT/US2020/059829, dated Feb. 25,2021, 18 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvvak et al., "Robust Re-identification of Manta Rays from Natural Markings by Learning Pose Invariant Embeddings," CoRR, Feb. 2019, arXiv:1902.10847v1, 12 pages.

Qiu et al., "Improving Transfer Learning and Squeeze- and-Excitation Networks for Small-Scale Fine-Grained Fish Image Classification," IEEE Access, Dec. 2018, 6(31):78503-78512.

Stein et al., "Consistent melanophore spot patterns allow long-term individual recognition of Atlantic salmon *Salmo salar*," Journal of Fish Biology, Nov. 2017, 91(6):1699-1712.

* cited by examiner

CALIBRATION TARGET FOR ULTRASONIC REMOVAL OF ECTOPARASITES FROM FISH

TECHNICAL FIELD

This specification relates to ultrasonic devices that are used in the context of aquaculture.

BACKGROUND

Sea lice and other ectoparasites can create significant problems for farmed fish. When sea lice attach themselves to fish, they feed on fish's natural mucus, which causes lesions to form. Such lesions may reduce the marketability of farmed fish, and can even cause farmed fish to die. Moreover, if sea lice are too plentiful on a farm, it can cause the farm to be required to shut down because of the effects on wild populations.

Sea lice may be extremely difficult to remove, as the sea lice are only a few millimeters long and may suction themselves very strongly onto the skin of fish. Removal can be even more difficult when sea lice embed themselves within the mucus of host fish or between fish scales.

SUMMARY

In general, innovative aspects of the subject matter described in this specification relate to a calibration target used for the ultrasonic removal of ectoparasites such as sea lice from fish. Sea lice may be removed or loosened from fish using ultrasonic signals. For example, ultrasonic signals may be used to generate cavitation bubbles that form under and around sea lice, allowing water rushing past the fish and natural motion of fish to dislodge the lice. Ultrasonic signals, even without cavitation bubbles, may also traverse along sea lice to sweep the sea lice off fish. Additionally, ultrasonic signals may break a carapace of sea lice so that freshwater or another substance lethal only to the lice may penetrate and kill the sea lice, or damage/disable reproductive capability.

However, because ultrasonic signals could potentially damage or descale fish, the enhanced techniques described by this specification may specifically focus energy on sea lice instead of fish. Because targeting of ultrasonic signals may be difficult, as ultrasonic signals propagate differently in water based on many factors such as water temperature, water pressure, water chemistry, concentration of fish mucus, and concentration of excrement, repeated self-calibration by the device may enable more accurate targeting. For example, temperature changes alone may cause ultrasonic signals to converge at locations that are centimeters apart and a sea lice may only be millimeters long, so repeated self-calibration may allow the device to determine different ultrasonic signals that converge at a particular location that may be most effective for louse elimination as temperatures change.

To account for changes in propagation, a sea lice treatment station may use self-calibrating ultrasonic removal of sea lice. The sea lice treatment station may include many ultrasonic transducers that are distributed throughout the sea lice treatment station. The sea lice treatment station may continually perform self-calibration to determine propagation parameters that take into account how ultrasonic signals propagate through water within the sea lice treatment station at the moment of treatment. When the sea lice treatment station detects a sea louse on a fish, the sea lice treatment may use the propagation parameters to generate ultrasonic signals that focus energy at or near the sea louse. Accordingly, the sea lice treatment station may use ultrasonic signals to safely remove sea lice from fish.

A sea lice treatment station may calibrate with a physical calibration target that mimics a fish. The calibration target may have similar physical properties to fish, and include various sensors distributed on or within the calibration target. Use of the calibration target may allow accurate prediction of energy that will be present at various locations of fish. For example, a sensor of the calibration target may sense exactly how much energy will be present at a specific location where a sensor is positioned after ultrasonic waves reflect off other portions of the calibration target to the location and other ultrasonic waves propagate through the fish to that location.

The calibration target may be embedded with sensors at various locations to measure intensity and rates of phonon propagation. Sensor data from the sensors may be used for closed-loop feedback that increases efficacy of beam-forming ultrasonic waves and reduces probability of damage to sensitive regions of fish. The known locations of sensors may also be used to reduce three dimensional (3D) displacement errors and increase accuracy and precision of target finding.

One innovative aspect of the subject matter described in this specification is embodied in a calibration target that includes a fish-shaped structure, sensors positioned at different locations of the fish-shaped structure, where each of the sensors sense energy at a respective location of the fish-shaped structure, a processor that receives sensor values from the sensors, and a transmitter that outputs sensor data from the calibration target based on the sensor values.

A second innovative aspect of the subject matter described in this specification is embodied in a method that includes obtaining initial parameters for ultrasonic transducers around a calibration target, where the calibration target includes, a fish-shaped structure, sensors placed at different locations of the fish-shaped structure, where each of the sensors sense energy at a respective location of the fish-shaped structure, a processor that receives sensor values from the sensors, and a transmitter that outputs sensor data from the calibration target based on the sensor values, obtaining the sensor data from the calibration target, determining the respective locations of the sensors, and determining adjusted parameters for the ultrasonic transducers around the calibration target based on the sensor data and the respective locations of the sensors.

A third innovative aspect of the subject matter described in this specification is embodied in a calibration target obtained by a process that includes obtaining a fish-shaped structure, placing sensors at different locations of the fish-shaped structure, where each of the sensors sense energy at a respective location of the fish-shaped structure, installing a processor that receives sensor values from the sensors, and installing a transmitter that outputs sensor data from the calibration target based on the sensor values.

Other implementations of this and other aspects include corresponding systems, apparatus, and computer programs, may be configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects the fish-shaped structure includes a gill plate portion, a dorsal fin portion, and a caudal fin portion, and the sensors include a first sensor at the gill plate portion, a second sensor at the dorsal fin portion, and a third sensor at the caudal fin portion. In some implementations, the fish-shaped structure includes a bulk mass that mimics fish muscle response to the energy, a scale layer that mimics fish scale response to the energy, where the scale layer is over the bulk mass, and a fish mucus layer that mimics fish mucus response to the energy, where the fish mucus layer is over the scale layer.

In certain aspects, the sensors include a particular sensor inside a parasite target that mimics parasite response in respect to the energy, where the parasite target is positioned beneath the fish mucus layer and above the bulk mass. In some aspects, the sensors include ultrasonic sensors that sense ultrasonic energy. In some implementations, the sensor values indicate an amount of ultrasonic energy sensed at the respective locations. In certain aspects, sensors include at least one of force sensors that sense physical force or photodiodes that sense light.

In some aspects, the processor is a microcontroller that is embedded within the fish-shaped structure, where the microcontroller is coupled to the sensors by electrically conductive wires. In some implementations, the transmitter outputs the sensor data over an electrically conductive wire. In certain aspects, the transmitter outputs the sensor data wirelessly. In some aspects, the sensor data indicates the respective locations of the sensors positioned at the different locations of the fish-shaped structure. In some implementations, the fish-shaped structure includes a non-transitory computer-readable medium that stores a configuration file that indicates the respective locations of the sensors positioned at the different locations of the fish-shaped structure.

In certain aspects, determining the respective locations of the sensors includes determining parts of the fish-shaped structure that each of the sensors are located at. In some aspects, determining the respective locations of the sensors includes determining a location of the calibration target within a sea lice treatment station. In some implementations, obtaining the sensor data from the calibration target includes determining a first portion of the sensor data from the calibration target while the calibration target is at a first location within a sea lice treatment station and determining a second portion of the sensor data from the calibration target while the calibration target is at a second, different location within the sea lice treatment station.

In certain aspects, obtaining the fish-shaped structure includes obtaining a bulk mass that mimics fish muscle properties in respect to the energy, forming, over the bulk mass, a scale layer that mimics fish scale properties in respect to the energy, and forming, over the scale layer, a fish mucus layer that mimics fish mucus properties in respect to the energy. In some aspects, placing sensors at different locations of the fish-shaped structure includes embedding a particular sensor underneath the fish mucus layer and inside the scale layer. In some implementations, the process includes coupling the processor with the sensors by electrically conductive wires.

The above-noted aspects and implementations further described in this specification may offer several advantages. For example, the device may remove sea lice off fish with less damage to the fish than existing sea lice removal solutions. In another example, the device may reduce an amount of energy used by more efficiently directing ultrasonic energy at sea lice. In yet another example, the device may increase the health of fish being raised in aquaculture environments. In still another example, the device may work in a larger range of environmental conditions (e.g., temperatures, water chemistries, station geometries, etc.).

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

The subject matter described in this specification describes various aspects, including a sea lice treatment station in FIGS. 1-5, and a calibration target in FIGS. 6-10.

Figure 1:
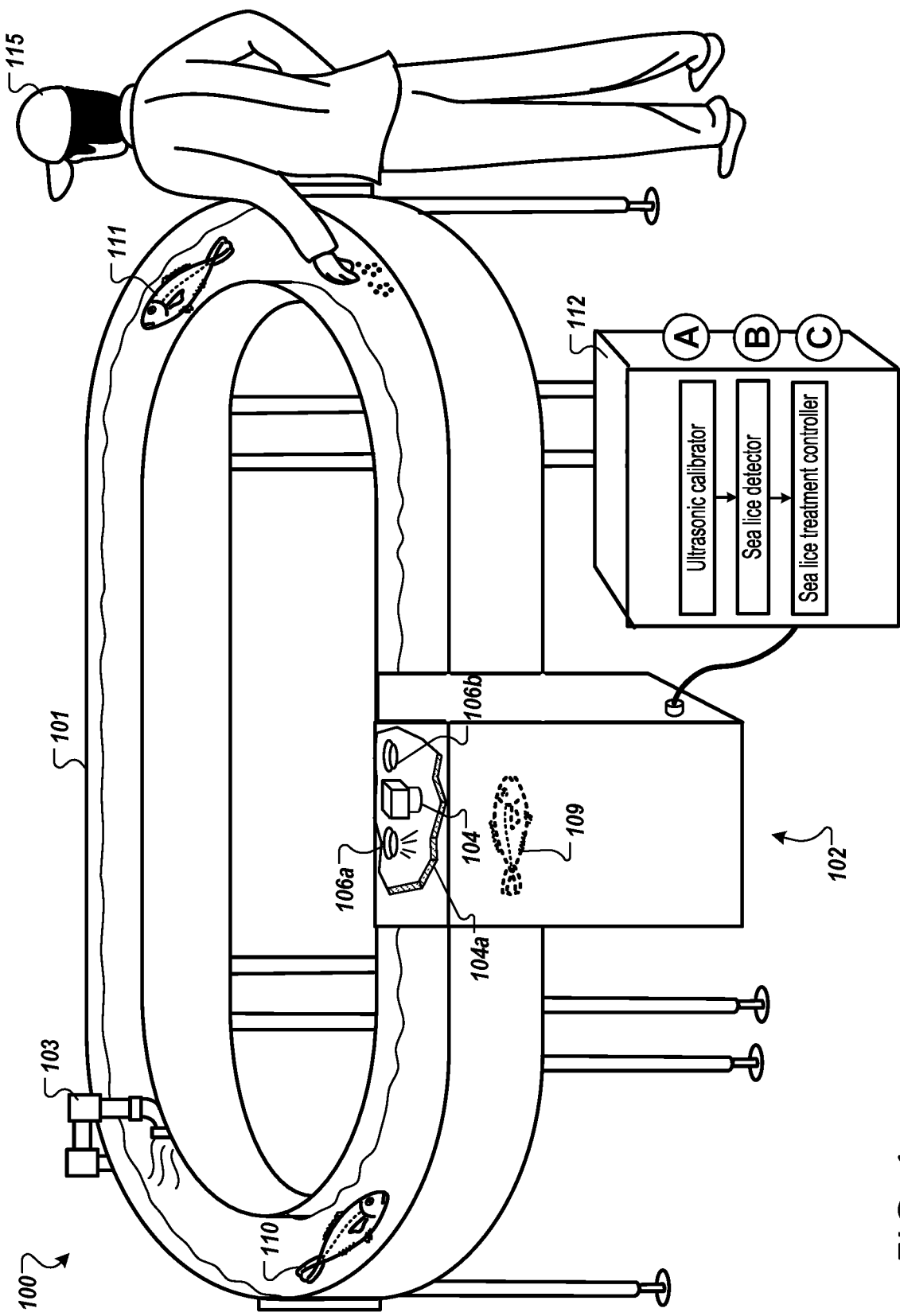
FIG. 1 is a diagram showing an example of a sea lice treatment system.

FIG. 1 is a diagram showing an example of a sea lice treatment system 100. While the sea lice treatment system 100 is described in various examples as treating sea lice, the sea lice treatment system 100 may similarly be used to treat other ectoparasites that attach to fish, as described further below. The system 100 includes a fish tank 101 and a sea lice treatment station 102 connected to the fish tank 101. A water pump 103 helps circulate the water of the fish tank 101.

A dotted outline of the first fish 109 is used to illustrate that the first fish 109 is inside the sea lice treatment station 102. An alternative view of the sea lice treatment station 102 and the fish being treated for sea lice is presented in FIGS. 2A and 2B. A second fish 110 and a third fish 111 (and perhaps other fish) swim within the fish tank 101. The fish 109 may be placed in the fish tank 101, and may be observed, by a worker 115.

A visual cutout 104d is used to show internal elements of the sea lice treatment station 102. The sea lice treatment station 102 includes a camera 104 and ultrasonic transducers 106a, 106b (collectively referred to as 106). While only two ultrasonic transducers 106 are shown in FIG. 1, the sea lice treatment station 102 may include one hundred, two hundred, or some other number of ultrasonic transducers 106.

The ultrasonic transducers 106 may generate ultrasonic signals and detect ultrasonic signals. For example, the ultrasonic transducers 106 may be ultrasonic transceivers, or a combination of ultrasonic transmitters that emit ultrasonic signals and ultrasonic receivers that sense ultrasonic signals. The camera 104 is shown between the ultrasonic transducers 106. However, the camera 104 may be before the ultrasonic transducers 106 in the direction of water flow, or after ultrasonic transducers 106. While only a single camera is shown, the sea lice treatment station 102 may include multiple cameras to detect sea lice, and may also include lights.

A control unit 112 of the system 100 interfaces with elements including the sea lice treatment station 102. The control unit 112 may include digital electronic circuitry that forms an ultrasonic calibrator, a sea lice detector, and a sea lice treatment controller. The ultrasonic calibrator may determine propagation parameters of the sea lice treatment station 102. For example, the ultrasonic calibrator may perform self-calibration for a period of five minutes every hour, once a day at a particular time, or some other frequency. Additionally or alternatively, the sea lice treatment station 102 may perform the self-calibration whenever no fish are inside the sea lice treatment station 102. For example, the sea lice treatment station 102 may continue to perform self-calibration until a fish is detected about to enter the sea lice treatment station 102 by object detection on an image from the camera 104, pause self-calibration while the fish is inside the sea lice treatment station 102, and resume self-calibration once the sea lice treatment station 102 detects that the fish has exited the sea lice treatment station 102.

Propagation parameters may reflect how ultrasonic signals propagate through water within the sea lice treatment station 102. For example, propagation parameters may specify at least one of: pulse width of ultrasonic signals sensed by the ultrasonic transducers 106, time offsets between when ultrasonic signals were generated and sensed by the ultrasonic transducers 106, reflections of ultrasonic signals within the sea lice treatment station 102, spectral width of ultrasonic signals sensed by the ultrasonic transducers 106, or phase offset.

The sea lice detector may obtain images from the camera 104 and detect sea lice on fish. For example, the sea lice detector may detect a sea louse on one side of a tail of the fish 109. The sea lice treatment controller may, based on the propagation parameters, generate ultrasonic signals that focus energy on the sea louse that was detected. For example, the sea lice treatment controllers may determine different ultrasonic signals to be generated by different ones of the ultrasonic transducers 106, where energy of the signals converges so the location with highest energy is at the sea louse.

Stages A-C of FIG. 1 depict an example of the operation of the system 100. Specifically, in stage A, before the fish 109 enters to sea lice treatment station 102, the ultrasonic calibrator generates and senses ultrasonic signals by the ultrasonic transducers 106 and determines propagation parameters from the ultrasonic signals sensed. The sensed ultrasonic signals may be directly transmitted signals or reflected signals.

In stage B, the first fish 109 swims into the sea lice treatment station 102. When the fish 109 is within the field of view of the camera 104, the sea lice detector may receive images of the fish 109 and use object recognition to detect sea lice on the fish 109. For example, the sea lice detector may detect a sea louse on a tail of the fish by performing image-based object recognition on one or more images from the camera 104.

In stage C, the sea lice treatment controller may determine a set of ultrasonic signals that, when generated by the ultrasonic transducers 106, focuses energy on the location of the sea louse within the sea lice treatment station 102. For example, the sea lice treatment controller may determine to only generate ultrasonic signals on thirty of two hundred ultrasonic transducers 106, where the ultrasonic signals are different from one another and converge most energy at the location of the sea louse.

In some implementations, stages B and C may repeat until all sea lice are removed or loosened from the fish 109. For example, stages B and C may repeat once every one fifty milliseconds while the fish 109 is within the sea lice treatment station 102. In another example, stages B and C may be performed once each time the fish 109 passes through the sea lice treatment station 102. In some implementations, the energy focused on the sea louse may be increased until the sea lice detector no longer detects the sea louse on the fish or a maximum energy limit that is safe for fish is reached.

After sea lice treatment in the sea lice treatment station 102 takes place, the first fish 109 may exit the sea lice treatment station 102 and resume swimming freely within the fish tank 101. Further detections by the system 100 can take place concerning the second fish 110 after the second fish 110 swims around the fish tank 101 and into the sea lice treatment station 102. Once the second fish 110 is within the sea lice treatment station 102, the sea lice treatment station 102 can treat the second fish 110 for sea lice in a similar manner to discussed above in reference to the first fish 109.

In some implementations, the sea lice treatment system 100 may not include a camera. The sea lice treatment system 100 might be so gentle that ultrasonic signals may provide ultrasonic energy all over the fish, or the sea lice treatment system 100 might always target behind the adipose and dorsal fins where lice is most commonly found. For example, the sea lice treatment system 100 may detect the presence, location, size, and orientation of fish based on changes in ultrasonic signals sensed by the ultrasonic transducers 106 and then, without attempting to detect sea lice on the fish, transmit ultrasonic signals with the ultrasonic transducers 106 according to the propagation parameters that target a predetermined amount of ultrasonic energy at the adipose and dorsal fins.

Figure 2B:
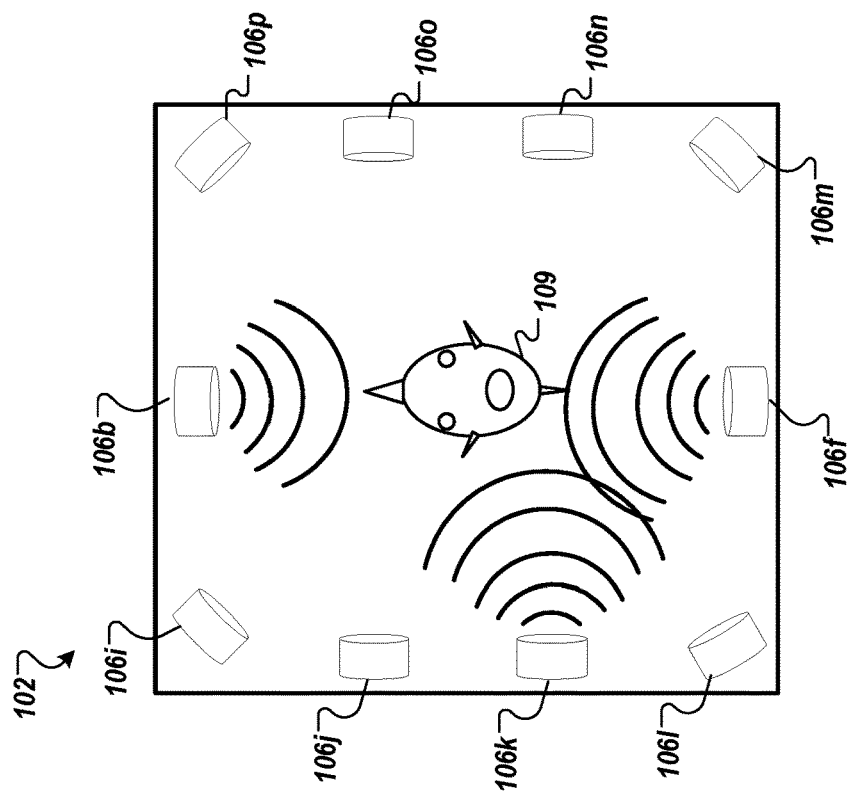
FIGS. 2A and 2B are diagrams showing an example sea lice treatment station.
Figure 2A:
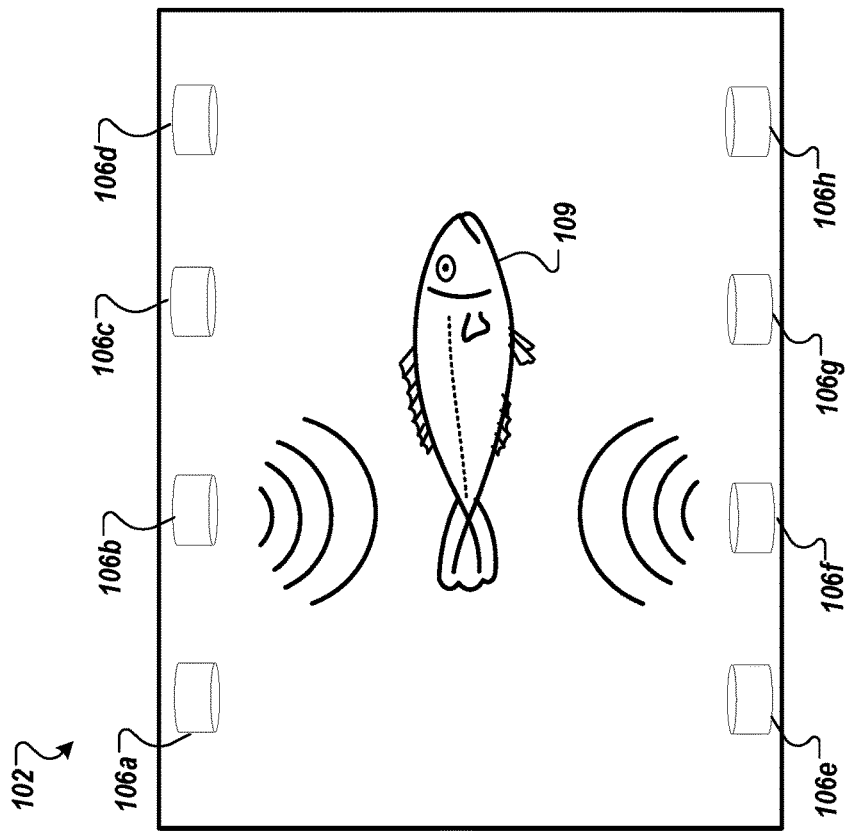

FIGS. 2A and 2B are diagrams showing an example sea lice treatment station. FIG. 2A shows a side view of the sea lice treatment station 102 and FIG. 2B shows a cross-sectional view of the sea lice treatment station 102. A shown in FIG. 2A, the sea lice treatment station 102 may include ultrasonic transducers 106a-106h distributed along the top and bottom of the sea lice treatment station 102. FIG. 2B shows that the ultrasonic transducers 106b, 106f, and 106i-106p may be distributed along four walls of the sea lice treatment station 102. However, the sea lice treatment station 102 may have other geometries. For example, the sea lice treatment station may be cylindrical with ultrasonic transducers distributed along a single inner wall or shaped as an octogon with ultrasonic transducers distributed along eight walls. In some implementations, the sea lice treatment station may have a geometry that is designed to have oppositely curved wall sections to act as a focusing/resonant cavity or, in contrast, have lightly changed angles of planar surfaces to reduce back reflection directly into a local transducer.

For example, for a sea louse located on the left of the fish as shown in FIG. 2B, the sea lice treatment controller may receive x, y, z coordinates of the sea louse in the sea lice treatment station 102 from the sea lice detector, determine a position of the fish 109 based on images from the camera 104, and determine a particular combination of ultrasonic signals to be generated by only ultrasonic transducers 106*b*, 106*f*, and 106*k*.

The sea lice treatment controller may determine the ultrasonic signals to generate based on obtaining stored propagation parameters for each of the ultrasonic transducers 106*a*-106*p* and calculating a combination of ultrasonic signals to be generated by the ultrasonic transducers that increases ultrasonic energy at the location of the sea louse relative to other locations in the sea lice treatment station 102, especially where the fish is located.

For example, the sea lice treatment controller may determine to generate particular ultrasonic signals at only ultrasonic transducers 106*b*, 106*f*, and 106*k*. The determination may be based on determining that according to the propagation parameters for all of the ultrasonic transducers 106*a*-106*p* that the combination of the particular ultrasonic signals are expected to propagate to focus more energy at the sea louse, while maintaining a safe amount of energy at the fish, than any other combination of ultrasonic signals.

As mentioned in FIG. 1, the propagation parameters for the ultrasonic transducers 106*a*-106*p* may be determined during a periodic calibration before the fish 109 enters the sea lice treatment station 102. For example, the ultrasonic calibrator may, for each of the ultrasonic transducers 106*a*-106*p*, iteratively generate ultrasonic signals at different frequencies, pulse duration, signal duration, amplitudes, phase delay, and phase launch, and detect the ultrasonic signals at the other transducers to determine propagation parameters for the ultrasonic transducer that transmitted the ultrasonic signals. The determination of propagation parameters and calculation of ultrasonic signals based on the propagation parameters is discussed in more detail below in regards in FIG. 4.

While FIG. 2A only shows two ultrasonic transducers transmitting and FIG. 2B only shows three ultrasonic transducers transmitting, in some other examples, five, ten, fifteen, fifty, one hundred, three hundred, or some other number of hundreds of transducers may simultaneously transmit ultrasonic signals.

Figure 3:
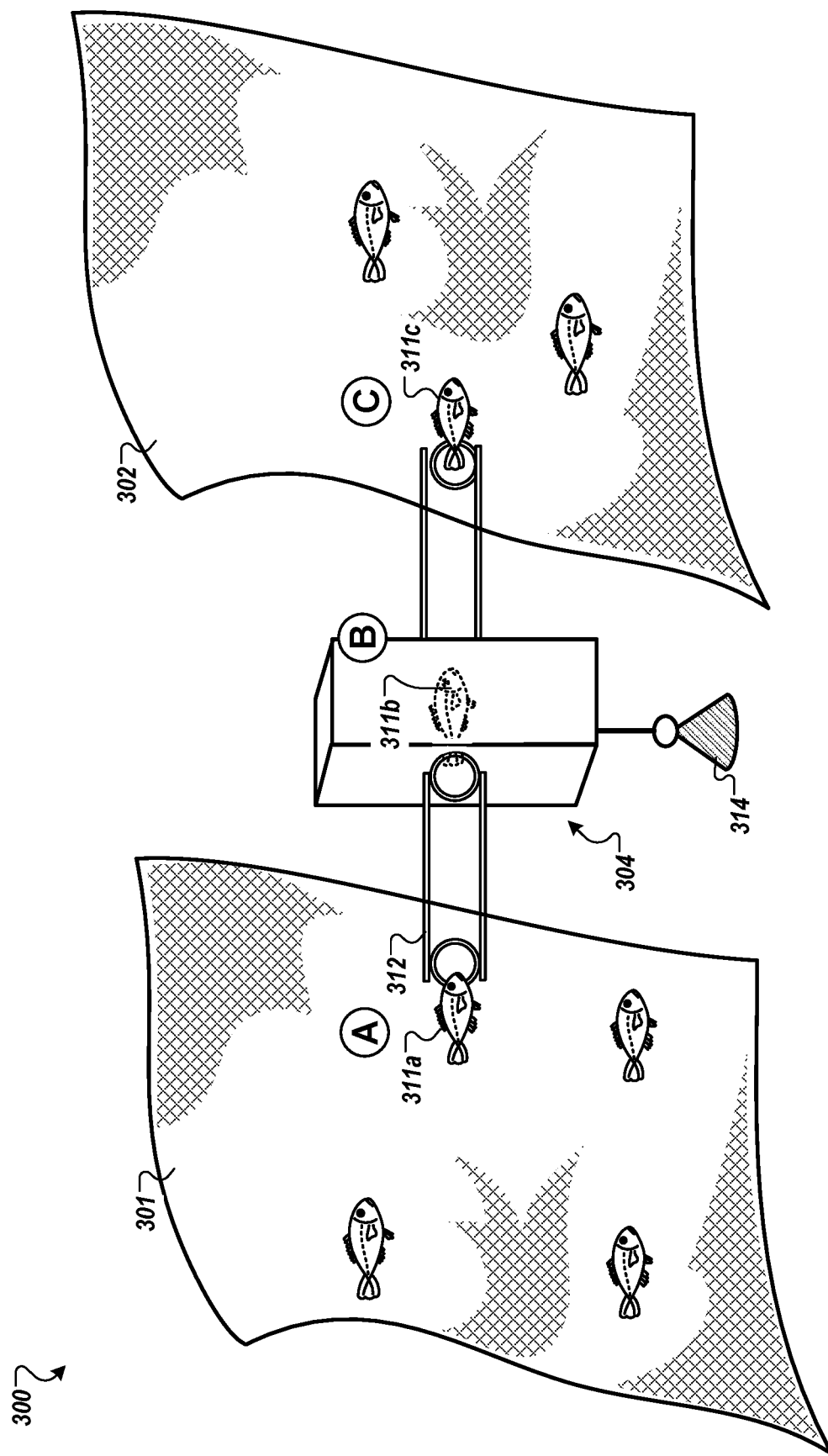
FIG. 3 is a diagram showing an example of a sea lice treatment system.

FIG. 3 is a diagram showing an example of a sea lice treatment system 300. The system 300 is shown in an open water environment. Nets 301 and 302 are used in this implementation to direct fish into a sea lice treatment station 304. The system 300 includes the nets 301 and 302, the sea lice treatment station 304, a fish 311 (shown in three stages as 311*a*, 311*b* and 311*c*), a tube 312 feeding into the sea lice treatment station 304, and a weight 314 that provides stability to the sea lice treatment station 304.

The sea lice treatment station 304 is another implementation of the sea lice treatment station 102 shown in FIG. 1 and FIGS. 2A and 2B. The sea lice treatment station 304 similarly includes a camera and ultrasonic transducers.

FIG. 3 is shown in three stages. Stage A corresponds to the fish 311*a* entering the tube 312. Stage B corresponds to the fish 311*b* within the sea lice treatment station 304 being treated for sea lice. Stage C corresponds to the fish 311*c* exiting the sea lice treatment station 102 through the tube 312.

Stage A of FIG. 3 shows the fish 311*a* entering the tube 312 from the net 301 enclosure. Other fish are within the net 301. In general, there is no limit to the number of fish able to be processed by the sea lice treatment station 304.

Stage B of FIG. 3 shows the fish 311*b* within the sea lice treatment station 304 being treated for sea lice. The fish 311*b* is a representation of the fish 311*a* shown at a later time in a different location. The sea lice treatment station 304 uses a control unit similar to the control unit 112 of FIG. 1 to calibrate ultrasonic signals, detect sea lice, and treat for sea lice.

Stage C of FIG. 3 shows the fish 311*c* exiting the sea lice treatment station 102 through the tube 312. An incentive can be used to move the fish from the tube 312 to the net 302. Depending on implementation, the incentive can include food or physical forces such as water currents.

In some implementations, the sea lice treatment system 300 can be floating within a body of water. For example, the sea lice treatment system 300 can be submerged within a body of water containing one or more fish. The one or more fish contained within the body of water may be processed by the sea lice treatment system 300.

Figure 4:
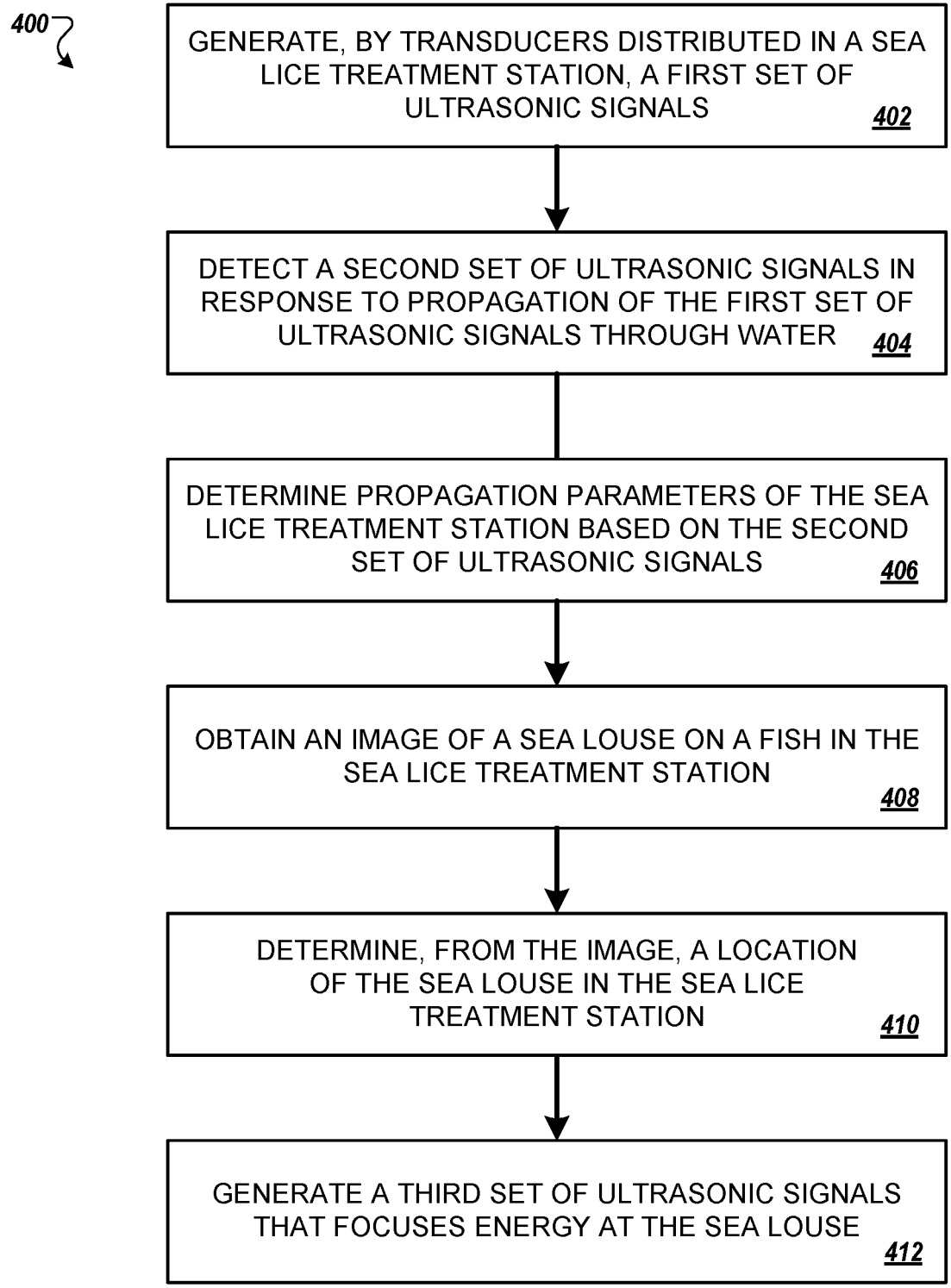
FIG. 4 is a flow diagram illustrating an example of a process for self-calibrating ultrasonic removal of sea lice.

FIG. 4 is a flow diagram illustrating an example of a process 400 for self-calibrating ultrasonic removal of sea lice. Briefly, and as will be described in more detail below, the process 400 includes generating, by transducers distributed in a sea lice treatment station, a first set of ultrasonic signals, detecting a second set of ultrasonic signals in response to propagation of the first set of ultrasonic signals through water, determining propagation parameters of the sea lice treatment station based on the second set of ultrasonic signals that were detected, obtaining an image of a sea louse on a fish in the sea lice treatment station, determining, from the image, a location of the sea louse in the sea lice treatment station, and generating a third set of ultrasonic signals that focuses energy at the sea louse.

The process 400 includes generating, by transducers distributed in a sea lice treatment station, a first set of ultrasonic signals (402). For example, the ultrasonic calibrator may control the ultrasonic transducers 106 to generate ultrasonic signals.

The process 400 includes detecting a second set of ultrasonic signals in response to propagation of the first set of ultrasonic signals through water (404). For example, the ultrasonic calibrator may control the ultrasonic transducers 106 to detect for ultrasonic signals.

In some implementations, detecting, by the ultrasonic transducers, a second set of ultrasonic signals in response to propagation of the first set of ultrasonic signals through water includes detecting, by a first ultrasonic transducer, ultrasonic signals in response to propagation of a first ultrasonic signal that was generated by a second ultrasonic transducer and detecting, by the first ultrasonic transducer, ultrasonic signals in response to propagation of a second ultrasonic signal that was generated by a third ultrasonic transducer after the first ultrasonic signal was generated. For example, while calibrating, the ultrasonic calibrator may generate an ultrasonic signal with one of the ultrasonic transducers 106, detect for the ultrasonic signal at all of the ultrasonic transducers 106, and then repeat both steps for each of the ultrasonic transducers 106.

In some implementations, instead of generating ultrasonic signals sequentially during calibration as described above, the ultrasonic calibrator may generate ultrasonic signals in parallel. For example, the ultrasonic calibrator may use the standing wave approach and use variable coded phase shifts to differentiate which signals are coming from which transducers without needing to run one at a time. If using the pulsed approach, the ultrasonic calibrator may use a similar encoding technique such as pulse width modulation or pulse density modulation that differentiates each transmitter so receivers can tell them apart.

The process 400 includes determining propagation parameters of the sea lice treatment station based on the second set of ultrasonic signals that were detected (406). For example, the ultrasonic calibrator may determine propagation parameters of the sea lice treatment station 102 based on what ultrasonic signals were generated at the ultrasonic transducers 106 and resultant ultrasonic signals detected at the ultrasonic transducers 106.

In some implementations, determining propagation parameters of the sea lice treatment station based on the second set of ultrasonic signals that were detected includes determining at least one of pulse width of ultrasonic signals of the second set of ultrasonic signals, time offsets between detections of the second set of ultrasonic signals and generation of the first set of ultrasonic signals, spectral width, phase offset, or reflections of the first set of ultrasonic signals. For example, the ultrasonic calibrator may determine the milliseconds between when an ultrasonic signal is generated at a first transducer and the ultrasonic signal is detected at a second transducer. In some implementations, determining propagation parameters may include determining precise transducer locations.

The process 400 includes obtaining an image of a sea louse on a fish in the sea lice treatment station (408). For example, the sea lice detector may receive an image captured by the camera 104, where the image shows the fish 109 inside the sea lice treatment station 102.

The process 400 includes determining, from the image, a location of the sea louse in the sea lice treatment station (410). For example, the sea lice detector may use object recognition to detect a sea louse on a tail of the fish 109, where the sea louse is detected to be in an exact middle of the water containing portion of the sea lice treatment station 102.

The process 400 includes generating a third set of ultrasonic signals that focuses energy at the sea louse (412). For example, the sea lice treatment controller may control the ultrasonic transducers 160 to generate ultrasonic signals that focus energy at the exact middle of the water in the sea lice treatment station 102.

In some implementations, generating a third set of ultrasonic signals that focuses energy at the sea louse includes determining, from the image, that a portion of the fish is not between a particular ultrasonic transducer and the sea louse, generating an ultrasonic signal of the third set of ultrasonic signals with the particular ultrasonic transducer. For example, from the perspective shown in FIG. 2A, the sea lice detector may determine that a sea lice is on the left side of the fish 109 which is directly in line of sight of the ultrasonic transducer 106$k$ and, in response, determine to use the ultrasonic transducer 106$k$ to generate one of the ultrasonic signals in the set of ultrasonic signals used to remove a sea louse.

In some implementations, generating a third set of ultrasonic signals that focuses energy at the sea louse includes determining, from the image, that a portion of the fish is between a particular ultrasonic transducer and the sea louse and based on determining, from the image, that the portion of the fish is between the particular ultrasonic transducer and the sea louse, determining not to generate an ultrasonic signal with the particular ultrasonic transducer. For example, the perspective shown in FIG. 2A, the sea lice detector may determine that a sea lice is on a left side of the fish 109 which is blocked from line of sight of the ultrasonic transducer 106$n$ by the fish 109 and, in response, determine not to use the ultrasonic transducer 106$n$ to generate any of the ultrasonic signals in the set of ultrasonic signals used to remove a sea louse.

In some implementations, generating, by the ultrasonic transducers and based on the propagation parameters and the location of the sea louse in the sea lice treatment station, a third set of ultrasonic signals that focuses energy at the sea louse includes determining phases of continuous wave ultrasonic signals in the third set of ultrasonic signals. For example, the ultrasonic signals may be continuous waves which vary in phase and period.

In some implementations, the process 400 includes generating, by the ultrasonic transducers and based on the propagation parameters and the location of the sea louse in the sea lice treatment station a third set of ultrasonic signals that focuses energy at the sea louse, includes determining time delays of pulsed ultrasonic signals in the third set of ultrasonic signals. For example, the ultrasonic signals may be pulses sent with different time delays.

In some implementations, the process 400 includes obtaining sensor data from at least one of a water temperature sensor, a water pressure sensor, or a water salinity sensor, where determining propagation parameters of the sea lice treatment station is based on the sensor data and the second set of ultrasonic signals that were detected. For example, the ultrasonic calibrator may use a current water temperature of 70° F. sensed by chemical properties of a thermometer to determine propagation parameters for other temperatures of water.

In some implementations, the process 400 includes determining that ultrasonic signals generated by a particular ultrasonic transducer satisfy self-cleaning criteria, and based on determining that ultrasonic signals generated by the particular ultrasonic transducer satisfy self-cleaning criteria, generating, by the ultrasonic transducers, a fourth set of ultrasonic signals that focus energy at the particular ultrasonic transducer. For example, the ultrasonic calibrator may determine that ultrasonic signals emitted by a particular transducer are sensed by other transducers as weaker than typical and, in response, determine that dirt, bio-foul, growth, or some other substance on the particular transducer might be interfering with signals from the particular transducer so direct energy at the particular transducer to attempt to remove dirt. In another example, the sea lice detector may visually determine that a particular transducer looks dirty in an image and, in response, direct energy at the particular transducer to attempt to remove dirt.

Figure 5:
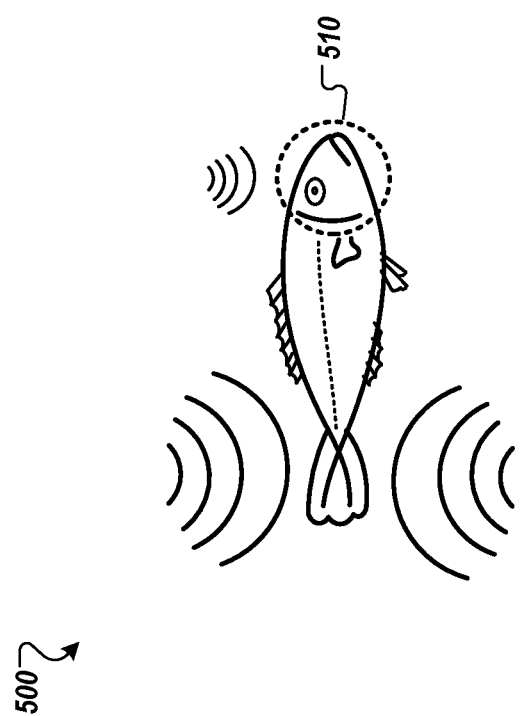
FIG. 5 is a diagram showing a sensitive area around an eye and gills of fish.

In some implementations, the process 400 includes determining that the sea louse is located near a particular part of a fish and determining ultrasonic signals accordingly. For example, the sea lice treatment controller may determine that the sea louse is within one centimeter of an eye of a fish or gills and, in response, determine not to generate ultrasonic signals to remove the sea louse to protect the sensitive eye or gills area. FIG. 5 is a diagram 500 showing a sensitive area 510 around an eye and gills of fish.

In another example, the sea lice treatment controller may determine that the sea louse is on a dorsal fin and, in response, determine to target the maximum energy limit that is safe for fish at the sea louse. For example, tough skin on the fish's spine may withstand stronger pressures from the ultrasonic transducers than more sensitive portions, near gills or eyes for example, which may require gentler pressures. In some implementations, the sea lice treatment controller may determine that an area of a particular fish is too damaged for the application of energy and, in response, choose not to fire to prevent death or damage to an already wounded fish.

In some implementations, the process 400 includes determining that another fish is located between the sea louse and an ultrasonic transducer. For example, the sea lice treatment controller may determine from an image captured by the camera 104 that a second fish is between the ultrasonic transducer 106k and the sea louse on a first fish and, in response, determine to generate a set of ultrasonic signals that focuses energy at the sea louse without transmitting from the ultrasonic transducer 106k as signals from the ultrasonic transducer 106k are expected to be blocked by the second fish. In another example, the sea lice treatment controller may determine from an image captured by the camera 104 that no other fish is between the ultrasonic transducer 106k and the sea louse on a first fish and, in response, determine that ultrasonic signals may be generated by ultrasonic transducer 106k as ultrasonic signals generated by the ultrasonic transducer 106k are not expected to be blocked by any other fish.

In some implementations, the process 400 includes determining that another fish is located in a particular location and, in response, determining to generate ultrasonic signals that do not generate a side lobe where ultrasonic energy is focused at the particular location. For example, the sea lice treatment controller may determine from an image captured by the camera 104 that a second fish is in a corner of the sea lice treatment station 102 and, in response, determine to generate ultrasonic signals that keep ultrasonic energy at the corner below an energy threshold while focusing energy on a sea louse attached to a first fish.

In some implementations, a second process for self-calibrating ultrasonic removal of sea lice may, similarly to process 400, generate a first set of ultrasonic signals, detect a second set of ultrasonic signals, and determine propagation parameters. The second process may then store the propagation parameters for later treatment of sea lice. For example, the sea lice treatment station 102 may perform the second process during stage A, and then store the propagation parameters.

A third process for self-calibrating ultrasonic removal of sea lice may, similarly to process 400, obtain an image of a sea louse and determine a location of the sea louse. The third process may then access propagation parameters previously stored. For example, the sea lice treatment station 102 may receive and store propagation parameters determined from some other device, and later access the propagation parameters from storage. The third process may continue with similarly generating a set of ultrasonic signals that focuses energy at the sea louse.

In some implementations, a fourth process for self-calibrating ultrasonic removal of sea lice may not focus energy at a detected sea louse. For example, similarly to process 400, the fourth process may generate a first set of ultrasonic signals, detect a second set of ultrasonic signals, and determine propagation parameters. However, instead of obtaining an image of a sea louse, the fourth process may instead detect the presence, location, size, and orientation of fish based on changes in ultrasonic signals sensed by the ultrasonic transducers 106 and then, without attempting to detect sea lice on the fish, transmit ultrasonic signals with the ultrasonic transducers 106 according to the propagation parameters that target a predetermined amount of ultrasonic energy at the adipose and dorsal fins.

In some implementations, the detection of sea lice can include specific species or stages of sea lice. For example, the several species of sea lice may include ectoparasitic copepods of the genera *Lepeophtheirus* and *Caligus*. The type of fish being analyzed can affect the process of sea lice detection. For example, upon detection of a salmon, a system can adapt a system of detection for the detection of *Lepeophtheirus salmonis*—a species of sea lice which can be especially problematic for salmon. In some implementations, a detection of a specific species of sea lice can be separated from other sea lice detections. For example, detection of *Lepeophtheirus salmonis* can be treated separately from detections of *Caligus curtis* and *Lepeophtheirus hippoglossi*.

While implementations are described above in the context of sea lice removal on salmon, self-calibrating ultrasonic removal may also be used to remove sea lice from other fish, or other ectoparasites from fish. For example, the sea lice treatment station 102 may remove sea lice from sea trout or three-spined stickleback, or remove *Benedenia seriolae*, an ectoparasitic flatworm that suctions onto yellowtail fish. Accordingly, the sea lice treatment system 100 may also be referred to as an ectoparasite treatment system, the sea lice detector may also be referred to as an ectoparasite detector, the sea lice treatment controller may also be referred to as an ectoparasite treatment controller, and references to sea lice and sea louse described above in regards to FIG. 4 and the first through fourth processes may be replaced with references to ectoparasites other than sea lice or more generally ectoparasites.

Figure 6:
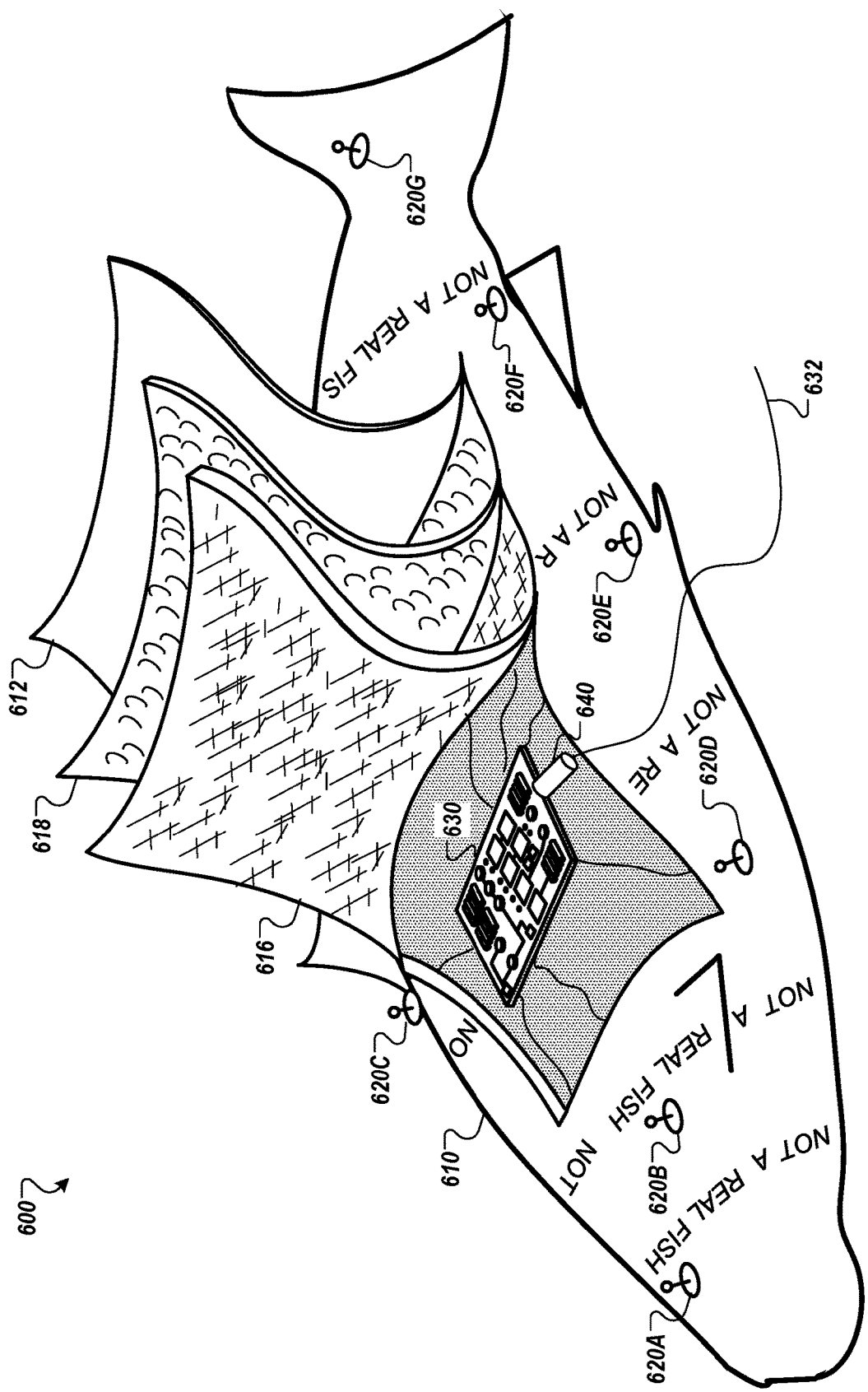
FIG. 6 is a diagram showing an example of a calibration target.

FIG. 6 is a diagram showing an example of a calibration target 600. The calibration target 600 may mimic a shape of a fish and be used to calibrate a sea lice treatment station. For example, calibration target 600 may be shaped like a salmon and be placed inside the sea lice treatment station 102 while the sea lice treatment station 102 is being calibrated. Briefly, and as will be described in more detail below, the calibration target 600 includes a fish-shaped structure 610, sensors 620A-H (collectively referred to as 620), a processor 630, and a transmitter 640. A calibration target 600 may be referred to as a phantom fish as the calibration target 600 may have a known size and known composition that is similar to an actual fish, and be used for measuring performance of a sea lice treatment station 102.

Figure 7:
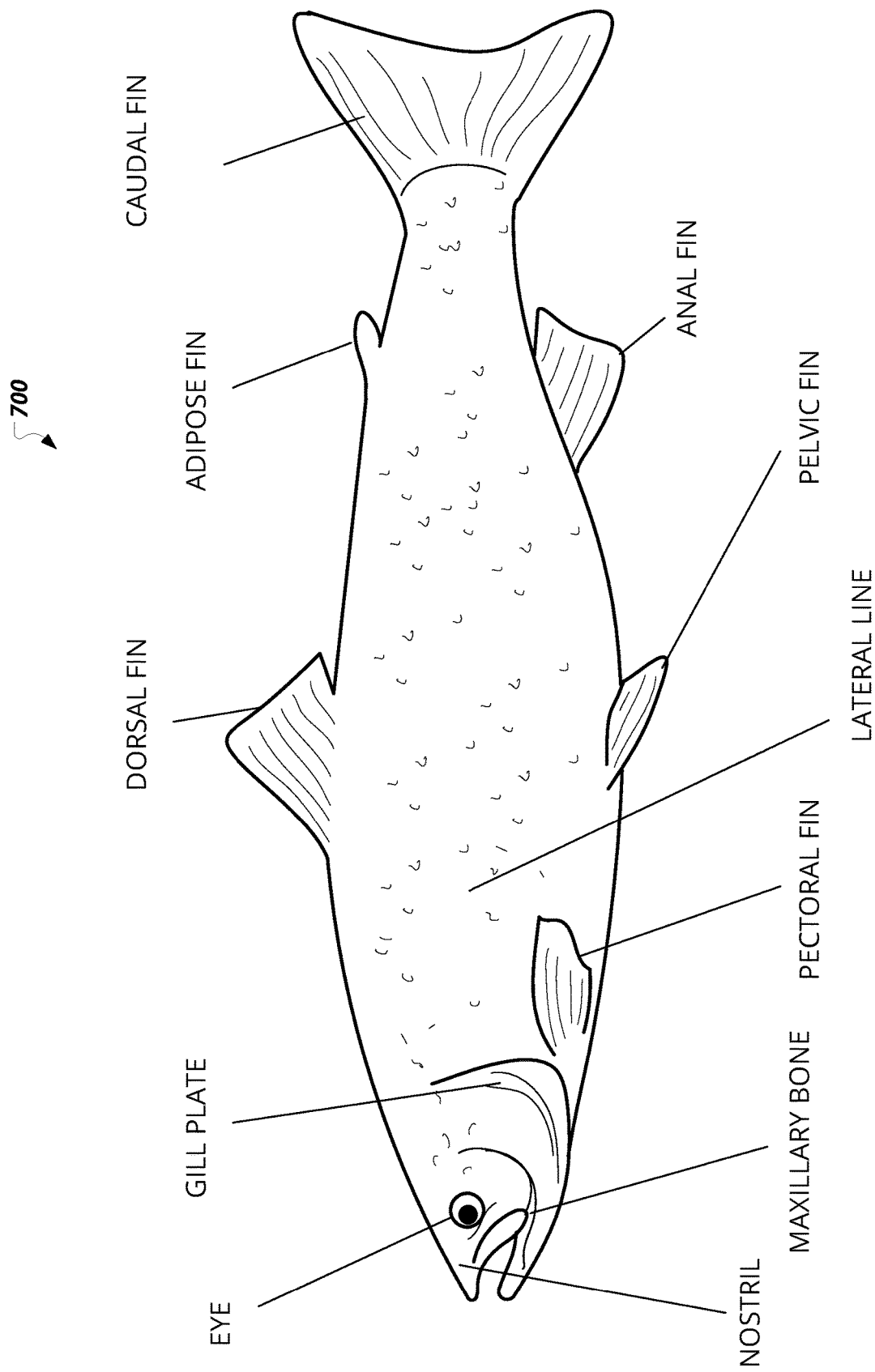
FIG. 7 is a diagram showing parts of a fish.

The fish-shaped structure 610 may be a physical object that has a shape similar to a fish, e.g., salmon, catfish, carp, trout, tilapia, halibut, or bass, etc. FIG. 7 is a diagram showing parts of a fish 700 that is a salmon. The fish 700 includes, as shown in a left lateral side, a nostril, an eye, a maxillary bone, a gill plate, a pectoral fin, a dorsal fin, a lateral line, a pelvic fin, an anal fin, an adipose fin, and a caudal fin. The fish-shaped structure 610 may include portions that correspond to each of the parts described above in the fish 700. For example, the fish-shaped structure 610 may include a gill plate portion near the front of the fish-shaped structure 610 where a gill plate is on the fish 700, a dorsal fin portion in the mid top of the fish-shaped structure 610 where a dorsal fin is on the fish 700, a caudal fin portion at the back end where the caudal fin is on the fish 700, etc.

The calibration target 600 may have a geometric shape and surface texture of a fish, and material variation throughout to maintain energy propagation that corresponds to an actual fish. For example, the calibration target 600 may have ultrasonic wave propagation fidelity that corresponds to an actual fish. Different portions of the calibration target 600 may be made of different material that propagates energy differently. For example, a first portion of the calibration target 600 may be made of a material that has a different acoustic impedance property than a second portion of the calibration target 600.

The fish-shaped structure 610 includes a bulk mass 616, a scale layer 618, and a fish mucus layer 612. The bulk mass 616 may mimic fish muscle response to energy. For example, the bulk mass 616 may be made of one or more of silicone or rubber derivatives such as latex or isoprene that has a similar acoustic impedance property or phonon propagation speed constants to fish muscle. In some implementations, the bulk mass 616 may be made of different material at different locations. For example, as the dorsal fin of fish may include dense muscle and the gill plate of fish may include soft gills, the bulk mass 616 around a gill plate portion of the calibration target 600 may be made of a material that has a different acoustic impedance property than a dorsal fin portion of the calibration target 600.

The scale layer 618 may be over the bulk mass 616 and mimic fish scale response to energy. For example, the scale layer 618 may be made of a thin ceramic coat that surrounds the bulk mass 616 and has a similar acoustic impedance property to fish scales. In some implementations, the scale layer 618 may be formed by a pattern cut into the bulk mass 616. For example, the scale layer 618 may be a top layer of the bulk mass 616 that has one millimeter deep cuts that form small triangles on a surface of the bulk mass 616. In some implementations, the material of the scale layer 617 may match a coefficient of thermal expansion of a fish. For example, the thin ceramic coat may be made of a material with the same coefficient of thermal expansion of fish.

The fish mucus layer 612 may mimic fish mucus response to energy. For example, the fish mucus layer may be made of a gel or jelly-like substance that has a similar acoustic impedance property to fish mucus.

The sensors 620 may be positioned at different locations of the fish-shaped structure 610. For example, the sensors 620 may include a first sensor 620A located at an eye portion of the fish-shaped structure 610, a second sensor 620B located at a gill plate portion of the fish-shaped structure 610, a third sensor 620C located at a dorsal fin portion of the fish-shaped structure 610, a fourth sensor 620D located at a pectoral fin portion of the fish-shaped structure 610, a fifth sensor 620E located at a pelvic fin portion of the fish-shaped structure 610, a sixth sensor 620F located at an anal fin portion of the fish-shaped structure 610, and a seventh sensor 620G located at a caudal fin portion of the fish-shaped structure 610.

In some implementations, the different locations that the sensors 620 are positioned at may be optimized for different fish shapes and different calibration techniques. For example, machine learning may be used to determine a set of locations for a limited number of sensors for salmon.

The sensors 620 may be located above, below, or within the bulk mass 616, the scale layer 618, and the fish mucus layer 612. For example, to measure energy experienced by an actual fish eye which would be below fish mucus and not below scales, the first sensor 620A may be located at the eye portion of the fish-shaped structure 610, below the fish mucus layer 612, and above the scale layer 618. In another example, to measure energy experienced by actual fish muscles that would be below scales, the third sensor 620C may be located at the dorsal fin portion of the fish-shaped structure 610, below the scale layer 618, and above the bulk mass 616.

In some implementations, the sensors 620 may include a particular sensor inside a parasite target that mimics parasite response to energy. For example, the parasite target may be the size and shape of sea lice, and be made of a material that has a similar acoustic impedance property as shells of sea lice. The parasite target may be positioned beneath the fish mucus layer 612 and above the bulk mass 616 similarly to how sea lice may be between fish scales. For example, the parasite target may be embedded within the scale layer 618 or placed on top of the scale layer 618. The particular sensor within the parasite target may measure energy that would be experienced by actual sea lice.

In some implementations, a sensor may not be inside the parasite target, but one or more sensors may be positioned around the parasite target. For example, a first particular sensor may be positioned between the parasite target and the fish mucus layer 612, and a second particular sensor may be positioned between the parasite target and the bulk mass 616. Accordingly, the energy that would be experienced by actual sea lice may be extrapolated based on the energies sensed by the first particular sensor and the second particular sensor.

In some implementations, the sensors may be one or more of ultrasonic receivers that sense ultrasonic signals, force sensors that sense physical force, photodiodes that sense light, or microphones that sense sound. For example, the sensors 620 may each include an ultrasonic receiver, a force sensor, a photodiode, and a microphone.

The processor 630 may receive sensor values from the sensors 620. For example, the processor 630 may receive a first value from the first sensor 620A, a second value from the second sensor 620B, etc. The magnitude of the sensor values may reflect an amount of energy sensed by the sensors 620. For example, a sensor value from the first sensor 620A that is double a sensor value from the second sensor 620B may reflect that twice as much energy was sensed at the first sensor 620A.

The processor 630 may store sensor values from the sensors 620. For example, the processor 630 may store the sensor values on a non-transitory computer readable medium also within the calibration target. In some implementations, the processor 630 may perform processing on the sensor values and store the processed sensor values as sensor data. For example, the processor 630 may receive sensor values from the first sensor 620A, determine averages of the sensor values for ten nanosecond time intervals, label each of the averages with an indication of the time interval and an indication of the first sensor 620A, and store the labeled averages as sensor data. In another example, the processor 630 may store the sensor values labeled with an indication of the first sensor 620A and an indication of the time received as the sensor data.

In some implementations, the sensor data indicates the respective locations of the sensors positioned at the different locations of the fish-shaped structure. For example, the sensor data may represent each sensor value with an indication of a location of a sensor that provided the sensor value. In another example, the sensor data may represent each sensor value with an indication of a sensor that provided the sensor value, and a server may then determine a location of the sensor based on a configuration file that identifies where each sensor was located.

In some implementations, the fish-shaped structure 610 includes a non-transitory computer-readable medium that stores a configuration file that indicates the respective locations of the sensors positioned at the different locations of the fish-shaped structure. For example, the fish-shaped structure may include a non-volatile memory card that has memory that is accessible to the processor 630 and stores the configuration file, and the processor 630 may output the configuration file to a server separately from the sensor data.

The transmitter 640 outputs sensor data from the calibration target based on the sensor values. For example, the transmitter 640 outputs sensor data that is generated by the processor 630 from the sensor values. In some implementations, the transmitter 640 may transmit the labeled averages through an electrically conductive wire that is coupled to a server. For example, a waterproof thin wire 632 may extend from the calibration target 600 through water and connect to a server. In some implementations, the transmitter 640 may wirelessly transmit the sensor data to a server. For example, the transmitter 640 may transmit the sensor data over Bluetooth, WiFi, or some other wireless technology.

Figure 8:
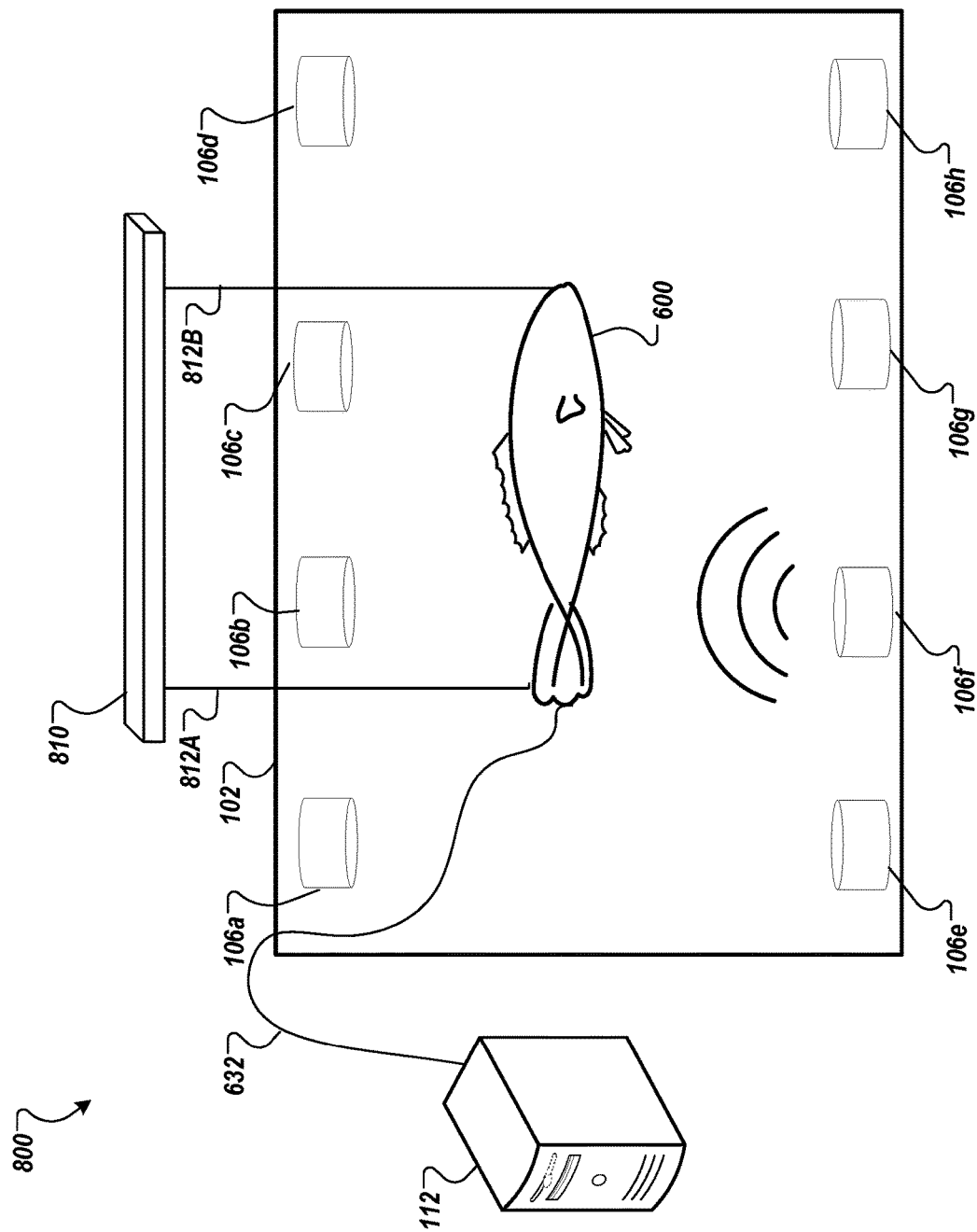
FIG. 8 is a diagram of an example system with a calibration target in a sea lice treatment station.

FIG. 8 is a diagram of an example system 800 with a calibration target 600 in a sea lice treatment station 102. In the system 800, the calibration target 600 provides sensor data to the control unit 112 over the waterproof thin wire 632. For example, the calibration target 600 may provide sensor data generated in response to different ultrasonic signals emitted by the ultrasonic transducers 106. In another example, the calibration target 600 is slowly moved through the sea lice treatment station 102 and sensor data for different ultrasonic signals emitted by the ultrasonic transducers 106 is obtained at each of the different locations.

The calibration target 600 may be mounted on wires. For example, the calibration target 600 may be mounted with the wires 812A and 812B (collectively referred to as 812). The wires may be attached to various locations of the calibration target 600. For example, the wire 812A may be attached to a front of the calibration target 600 and the wire 812B may be attached to a back of the calibration target 600. The wires may have a thickness that is less than a wavelength of the sensed energy and have a low mass to reduce interference of the energy by the wires. For example, the wires may be monofilaments with a thickness less than one millimeter. In some implementations, the wires may have a triangular cross section that reduces specular back reflection.

In some implementations, the calibration target 600 may be mounted on a stick covered with energy anechoic structure instead of mounted on wires. For example, the stick may be a long stick covered with ultrasonic anechoic structure and have one end mounted on the calibration target 600 underwater and another end above water held by a person. In some implementations, the calibration target 600 may not be mounted to anything, and may instead be neutrally buoyant and float through the sea lice treatment station 102.

Figure 9:
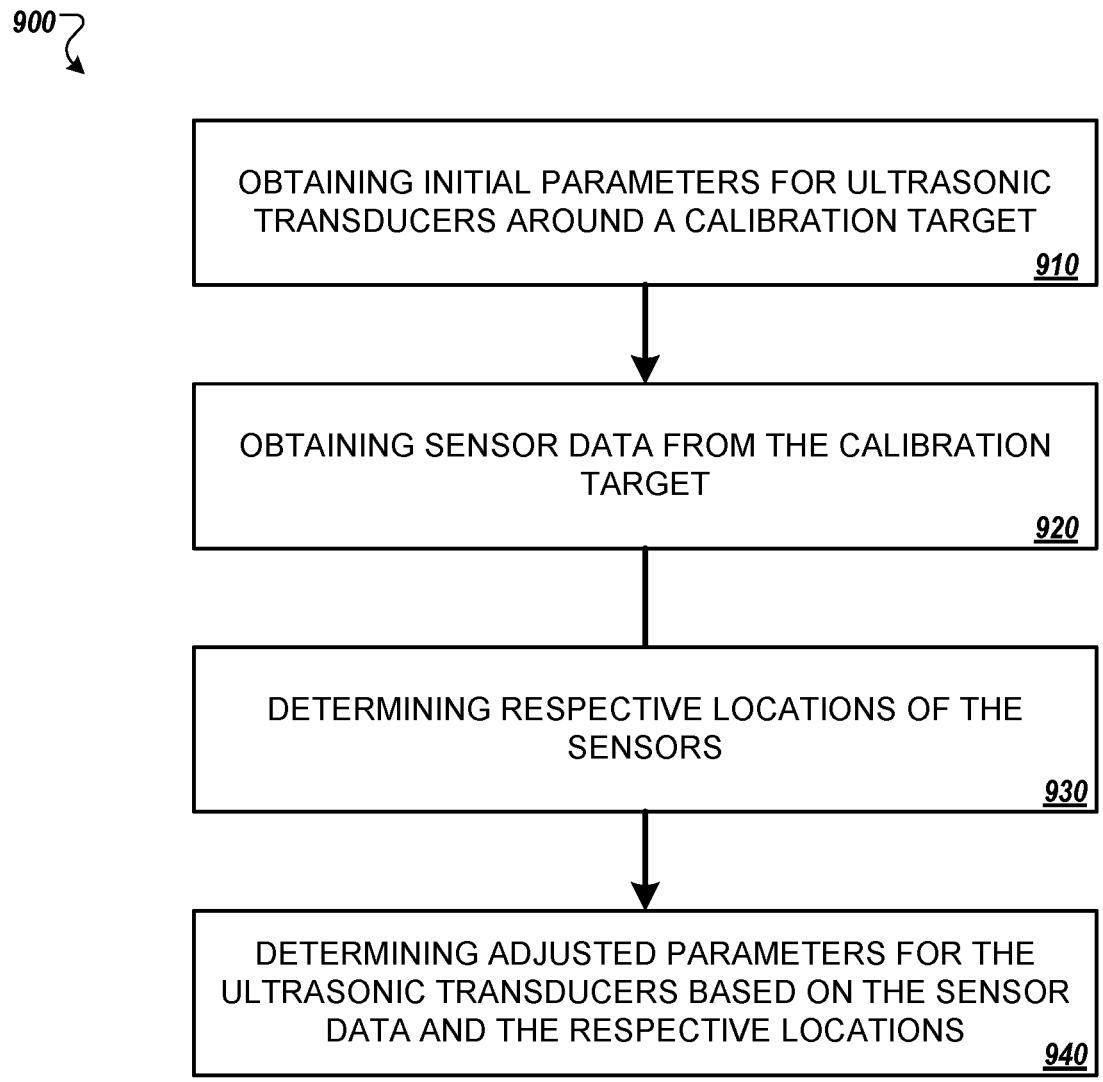
FIG. 9 is a flow diagram illustrating an example of a process for calibrating a sea lice treatment station with a calibration target.

FIG. 9 is a flow diagram illustrating an example of a process 900 for calibrating a sea lice treatment station with a calibration target. For example, the sea lice treatment station 102 may be calibrated with the calibration target 600. The process 900 may be used so that ectoparasite removal is gentle enough on fish to remove ectoparasites but strong enough to remove parasites, and may be used in closed loop monitoring and adjusting of energy application by the sea lice treatment station.

The strength needed to remove ectoparasites at different locations of fish may be pre-determined in a laboratory environment using real lice stuck on fish skins. There may be a high variability on the amount of energy necessary to remove a louse from a fish, or to sufficiently damage a louse such that it is no longer able to maintain vitality in the short term. The amount of energy may vary not only based on initial performance of the sea lice treatment station 102, but also on many application specifics such as environmental conditions, fish size/geometry, fish transit rate, louse size, local water temperature and chemistry, etc. Determination of the amount of energy may be determined with repeated trials that establish higher drive conditions for higher efficacy. Direct testing of specific cases for a sufficiently wide baseline of real geometry, fish and louse configurations, or at least sufficiently large as to be a representative baseline from which physical models with known constants (such as phonon propagation speed through water as a function of salinity and temperature), can support extrapolation.

The process 900 includes obtaining initial parameters for ultrasonic transducers around a calibration target (910). For example, the control unit 112 may obtain initial parameters for the ultrasonic transducers based on a configuration file that specifies initial parameters to use for calibration. In another example, the control unit 112 may obtain initial parameters for the ultrasonic transducers from user input.

The process 900 includes obtaining the sensor data from the calibration target (920). For example, the control unit 112 may receive sensor data output by the transmitter of the calibration target 600 while the calibration target 600 moves through different portions of the sea lice treatment station 102.

In some implementations, obtaining the sensor data from the calibration target includes determining a first portion of the sensor data from the calibration target while the calibration target is at a first location within a sea lice treatment station and determining a second portion of the sensor data from the calibration target while the calibration target is at a second, different location within the sea lice treatment station. For example, the first portion of the sensor data may be determined by the control unit 112 while the calibration target 600 is in the exact middle of a portion of the fish tank 101 within the sea lice treatment station 102, and the second portion of the sensor data may be determined by the control unit 112 while the calibration target 600 is at a bottom back farthest corner of the portion of the fish tank 101 within the sea lice treatment station 102.

The process 900 includes determining the respective locations of the sensors (930). For example, the control unit 112 may determine that the first sensor 620A is located at the eye region. In some implementations, determining the respective locations of the sensors includes determining parts of the fish-shaped structure that each of the sensors are located at. For example, the control unit 112 may determine which part of the fish-shaped structure 610 each of the sensors 620 is located at. In some implementations, the control unit 112 may determine parts of the fish-shaped structure that each of the sensors is located at based on a configuration file that specifies where each of the sensors 620 is located. For example, the control unit 112 may receive a configuration file from the calibration target 600 or the control unit 112 may generate and store a configuration file based on user input that specifies where each sensor is located.

In some implementations, determining the respective locations of the sensors includes determining a location of the calibration target within a sea lice treatment station. For example, the control unit 112 may determine that the calibration target 600 is in the exact middle of a portion of the fish tank 101 within the sea lice treatment station 102, and determine the location of the sensor based on the location of the calibration target 600 being in the exact middle. In another example, the control unit 112 may determine that the calibration target 600 is at a bottom back farthest corner of the portion of the fish tank 101 within the sea lice treatment station 102. In some implementations, determining a location of the calibration target within a sea lice treatment station includes determining the location of the calibration target within the sea lice treatment station with a secondary localization system. For example, the sea lice treatment station 102 may determine that the calibration target 600 is in the exact middle of the portion of the fish tank 101 within the sea lice treatment station 102 based on visually recognizing the calibration target 600 in video from cameras.

The process 900 includes determining adjusted parameters for the ultrasonic transducers around the calibration target based on the sensor data and the respective locations of the sensors (940). For example, the control unit 112 may determine adjusted parameters that reduce ultrasonic energy at a location that the sensor data indicates is receiving too much ultrasonic energy. In another example, the control unit 112 may determine adjusted parameters that increase ultrasonic energy at a location that the sensor data indicates is receiving too little ultrasonic energy.

In some implementations, the process 900 may be performed by a calibration target instead of the control unit 112. For example, the process 900 may be performed by a calibration target similar to the calibration target 600 except that the processor of the calibration target may determine adjusted parameters for the ultrasonic transducers, and the transmitter does not output sensor data but instead outputs the adjusted parameters to the control unit 112.

In some implementations, care may be taken to avoid having the sensors modify coupling performance and skew measurements. Avoidance may include using two calibration targets, a first being a tuning target with a dense array of sensors around important locations, and a second being a confirmation target with inclusions and deeply embedded sensors that are able to measure effective performance of the system but not likely to contaminate the result or provide information.

In some implementations, the process 900 may include using multiple targets with varying properties. For example, rigidly fixed calibration targets with many sensors may be used for initial calibration, followed by floating or buoyant calibration targets with limited sensor feedback for end-to-end validation and fine calibration. The process 900 may occur at regular intervals (e.g, at each start-up or hourly).

While the process 900 is described with respect to ultrasonic energy, the process 900 may similarly apply to other types of energy. For example, the process 900 may be used with lasers and laser sensors instead of ultrasonic transducers and ultrasonic sensors.

Figure 10:
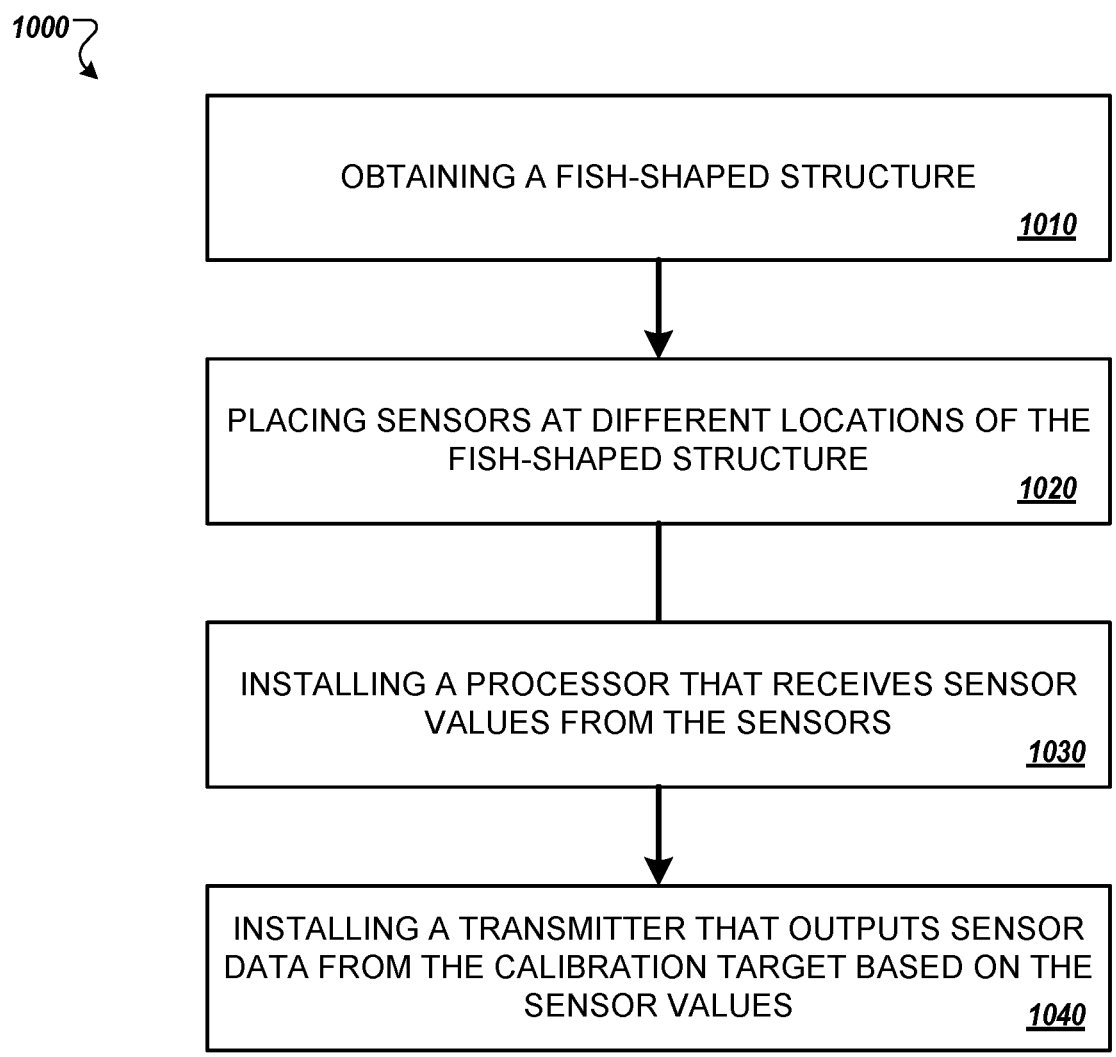
FIG. 10 is a flow diagram illustrating an example of a process for manufacturing a calibration target.

FIG. 10 is a flow diagram illustrating an example of a process 1000 for manufacturing a calibration target. For example, the process 1000 may be used to manufacture the calibration target 600.

The process 1000 includes obtaining a fish-shaped structure (1010). For example, a fish-shaped structure 610 may be 3D printed from a 3D printer. In another example, the fish-shaped structure 610 may be obtained from a commercial supplier of phantom fish.

The process 1000 includes placing sensors at different locations of the fish-shaped structure (1020). For example, a robot may automatically insert the sensors 620 in or on the scale layer 618 of the fish-shaped structure 610 at different locations of the fish-shaped structure 610. As discussed above, the different locations may be selected based on prioritizing locations where (i) sea lice may be located so energy may be verified to be at least enough to remove the sea lice and (ii) fish are more sensitive so energy may be verified to be below unsafe levels.

The process 1000 includes installing a processor that receives sensor values from the sensors (1030). For example, a robot may automatically insert the processor within the bulk mass 616 and wire the processor 630 to each of the sensors 620.

The process 1000 includes installing a transmitter that outputs sensor data from the calibration target based on the sensor values (1040). For example, a robot may automatically insert the transmitter 640 and connect the transmitter 640 to the processor 630 and the waterproof thin wire 632.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A calibration target comprising:
   a fish-shaped structure;
   sensors positioned at different locations of the fish-shaped structure, wherein each of the sensors sense energy at a respective location of the fish-shaped structure;
   a processor that receives sensor values from the sensors; and
   a transmitter that outputs sensor data from the calibration target based on the sensor values,
   wherein the fish-shaped structure includes:
      a bulk mass that mimics fish muscle response to the energy;
      a scale layer that mimics fish scale response to the energy, wherein the scale layer is over the bulk mass; and
      a fish mucus layer that mimics fish mucus response to the energy, wherein the fish mucus layer is over the scale layer, and
   wherein the sensors include a particular sensor inside a parasite target that mimics parasite response in respect to the energy, wherein the parasite target is positioned beneath the fish mucus layer and above the bulk mass.

2. The calibration target of claim 1, wherein the fish-shaped structure includes a gill plate portion, a dorsal fin portion, and a caudal fin portion, and
   wherein the sensors include a first sensor at the gill plate portion, a second sensor at the dorsal fin portion, and a third sensor at the caudal fin portion.

3. The calibration target of claim 1, wherein the sensors comprise ultrasonic sensors that sense ultrasonic energy.

4. The calibration target of claim 3, wherein the sensor values indicate an amount of ultrasonic energy sensed at the respective locations.

5. The calibration target of claim 1, wherein the sensors comprise at least one of:
   force sensors that sense physical force; or
   photodiodes that sense light.

6. The calibration target of claim 1, wherein the processor is a microcontroller that is embedded within the fish-shaped structure, wherein the microcontroller is coupled to the sensors by electrically conductive wires.

7. The calibration target of claim 1, wherein the transmitter outputs the sensor data over an electrically conductive wire.

8. The calibration target of claim 1, wherein the transmitter outputs the sensor data wirelessly.

9. The calibration target of claim 1, wherein the sensor data indicates the respective locations of the sensors positioned at the different locations of the fish-shaped structure.

10. The calibration target of claim 9, wherein the fish-shaped structure includes a non-transitory computer-readable medium that stores a configuration file that indicates the respective locations of the sensors positioned at the different locations of the fish-shaped structure.

11. A computer-implemented method, comprising:
obtaining initial parameters for ultrasonic transducers around a calibration target, wherein the calibration target includes:
a fish-shaped structure;
sensors placed at different locations of the fish-shaped structure, wherein each of the sensors sense energy at a respective location of the fish-shaped structure;
a processor that receives sensor values from the sensors; and
a transmitter that outputs sensor data from the calibration target based on the sensor values;
obtaining the sensor data from the calibration target;
determining the respective locations of the sensors; and
determining adjusted parameters for the ultrasonic transducers around the calibration target based on the sensor data and the respective locations of the sensors.

12. The method of claim 11, wherein determining the respective locations of the sensors comprises:
determining parts of the fish-shaped structure that each of the sensors are located at.

13. The method of claim 11, wherein determining the respective locations of the sensors comprises:
determining a location of the calibration target within a sea lice treatment station.

14. The method of claim 11, wherein determining a location of the calibration target within a sea lice treatment station comprises:
determining the location of the calibration target within the sea lice treatment station with a secondary localization system.

15. The method of claim 11, wherein obtaining the sensor data from the calibration target comprises:
determining a first portion of the sensor data from the calibration target while the calibration target is at a first location within a sea lice treatment station; and
determining a second portion of the sensor data from the calibration target while the calibration target is at a second, different location within the sea lice treatment station.

16. A calibration target obtained by a process comprising:
obtaining a fish-shaped structure, comprising:
obtaining a bulk mass that mimics fish muscle properties in respect to energy,
forming, over the bulk mass, a scale layer that mimics fish scale properties in respect to the energy, and
forming, over the scale layer, a fish mucus layer that mimics fish mucus properties in respect to the energy;
placing sensors at different locations of the fish-shaped structure, wherein each of the sensors sense the energy at a respective location of the fish-shaped structure;
installing a processor that receives sensor values from the sensors;
installing a transmitter that outputs sensor data from the calibration target based on the sensor values; and
coupling the processor with the sensors by electrically conductive wires.

17. The calibration target of claim 16, wherein placing sensors at different locations of the fish-shaped structure comprises:
embedding a particular sensor underneath the fish mucus layer and inside the scale layer.

* * * * *